Nov. 29, 1932.   H. COOPER   1,889,351
ANIMAL TRAP
Filed Aug. 25, 1931   2 Sheets-Sheet 1

Harry Cooper, INVENTOR
BY Victor J. Evans and Co.
ATTORNEY

Nov. 29, 1932.  H. COOPER  1,889,351
ANIMAL TRAP
Filed Aug. 25, 1931   2 Sheets-Sheet 2
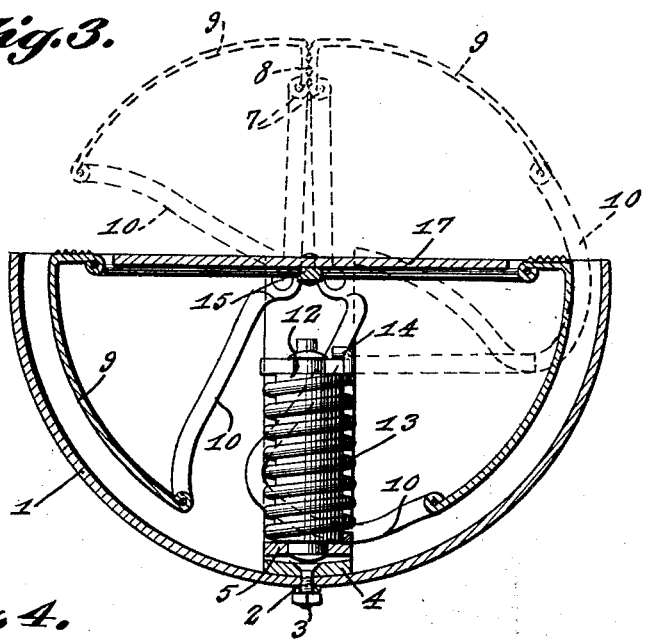
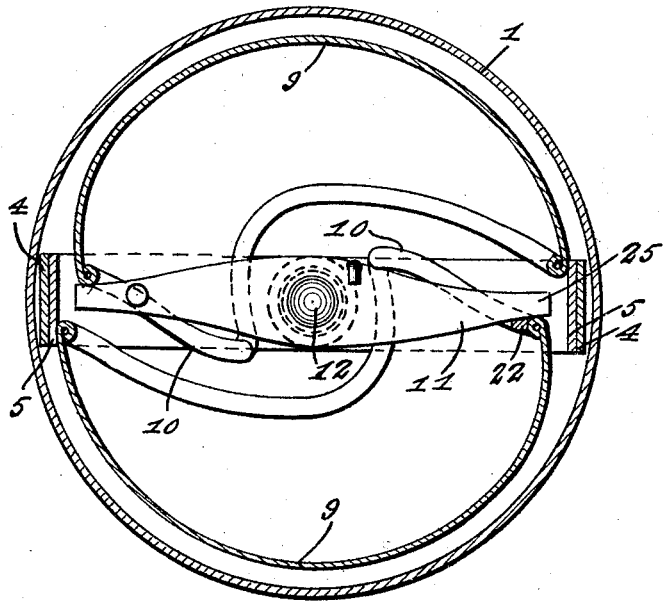
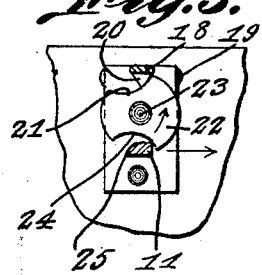
Harry Cooper, INVENTOR
BY Victor J. Evans and Co.
ATTORNEY Patented Nov. 29, 1932

1,889,351

UNITED STATES PATENT OFFICE

HARRY COOPER, OF CARROLLTON, MISSOURI

ANIMAL TRAP

Application filed August 25, 1931. Serial No. 559,272.

This invention relates to animal traps of the jaw type and has for the primary object the provision of an improved support for the jaws, whereby said jaws when in set position will be protected and substantially hidden from view to reduce the possibility of the jaws becoming fouled and materially aid in permitting the device to be camouflaged or covered from view, so that animals will not become suspicious thereof.

Another object of this invention is the provision of the support so constructed that the trap may turn or pivot relative to its anchor with an animal caught thereby to permit the animal to move about with a limited freedom reducing to a minimum the possibility of the animal inflicting self-injury.

A further object of this invention is the provision of the jaws having skirt portions cooperating with the support in preventing the animal from gaining freedom by knawing free the foot or leg portion caught within the trap and also provides a medium for the jaw operating means to engage for moving the jaws into gripping position.

A further object of this invention is the provision of the jaw operating means so mounted in the support and protected thereby that the danger of fouling is obviated and is practically concealed from view by said support, treadle and jaws when the latter are in set position.

A further object of this invention is the provision of means for permitting the jaws and their mounting to the support to be easily moved relative to the support so that the jaw operating means may be easily and quickly set and returned within the support.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating an animal trap constructed in accordance with my invention.

Figure 3 is a sectional view taken on the line 3—3 of Figure 1.

Figure 4 is a horizontal sectional view taken on the line 4—4 of Figure 1.

Figure 5 is a detail sectional view taken on the line 5—5 of Figure 1.

Figure 1:
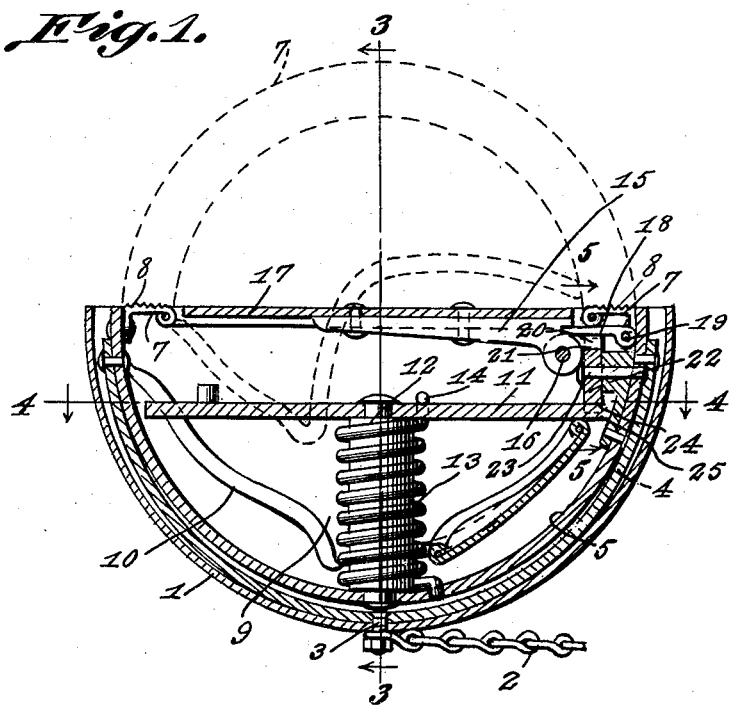

Referring in detail to the drawings, the numeral 1 indicates a semi-spherical shaped support having an anchoring chain 2 secured thereto by a bolt or like fastener 3. In use the chain is adapted to be secured to any suitable anchor (not shown) and the support may be substantially buried in the ground or positioned in shallow water, and due to the support being of solid walls will prevent the trap means located therein from contacting with the water and being affected by freezing and thawing of the water, also the trap means when the support is embedded within the ground is protected from being fouled.

A semi-circular shaped strap 4 is secured in the support 1 by the fastener 3 with its ends terminating adjacent the edges of the support and has pivoted to said ends a semi-circular shaped stirrup 5 to which jaws 7 are pivoted. The jaws are provided with serrated gripping faces 8 adapted to come into contact when the jaws are in released position and have formed thereon semi-spherical shaped skirt portions 9, the edges of which are cut away to form cam faces 10 to be engaged by the ends of an operating arm 11. The operating arm is journalled on a post 12 mounted on the stirrup 5 and is surrounded by a coiled spring 13 one end of which is secured to the operating arm 11 as shown at 14 while the other end is secured to the stirrup 5.

The spring 13 is of the tension type and adapted to influence the operating arm 11 in one direction and with the ends of said arm engaging the cam shaped edges 10 of the skirts 9, the jaws when freed will be moved toward each other to catch an animal between the gripping faces 8 thereof.

When the jaws are in a set position they lie within the support 1 thereby permitting the device to be easily concealed from view and also reducing to a minimum the possibility of the jaws becoming fouled.

Figure 2:
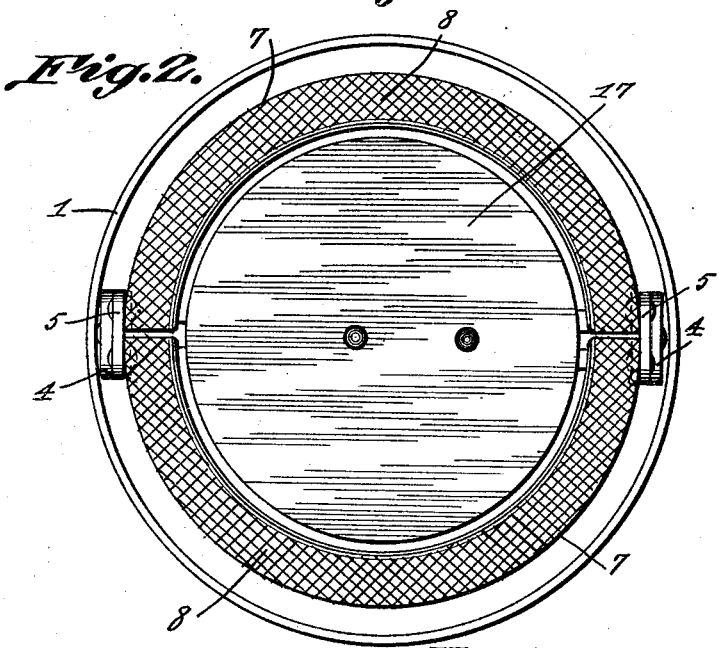
Figure 2 is a top plan view illustrating the jaws in a set position.

A treadle arm 15 is pivoted to the stirrup as shown at 16 and carries a treadle 17 adapted to substantially close the space between the jaws when the latter are in a set position as shown in Figure 2 and the pivoted end of the treadle arm 15 is provided with a notch to receive the free end of a latch element 18 which is pivoted to the stirrup 5 as shown at 19 and said latch element carries a substantially V-shaped lug or projection 20 to engage in a notch 21 of a holding disk 22 journalled to the stirrup 5 as shown at 23. A notch 24 is formed in the holding disk 22 opposite the notch 21 providing said holding disk with a weighted side and said notch 24 is adapted to receive the bevelled end 25 of the jaw operating arm 11. When the operating arm 11 is positioned in the notch 24, the tension of the spring 13 is increased and the holding disk 22 is held against rotation by the latch element 18 engaging in the notch 21 and the free end of the latch element engaging in the notch of the treadle arm 15. The latch element fitting in the notch of the treadle arm 15 holds the treadle in a set position as shown in Figures 1 and 2 so that an animal stepping on the treadle frees the trip element and allows the latter to disengage from the notch 21. The holding disk 22 is then free to rotate allowing the operating arm 11 to turn by the influence of the spring 13 and due to the arm being in engagement with the cam shaped edges 10 of the skirts 9, the jaws will be swung into gripping position as shown in dotted lines in Figure 3.

An animal caught between the jaws 7 will be prevented from gnawing the caught portion for the purpose of obtaining freedom due to the arrangement of the skirts 9 and also the support being of semi-spherical shape will allow the animal trapped to have limited freedom of movement to reduce to a minimum the possibility of the animal injuring itself and further the support being of semi-circular shape will permit the latter under the influence of an animal to turn or pivot, thus reducing the possibility of the animal rendering self-injury thereto.

The material from which the jaws and skirts is formed has the edges rolled to strengthen the jaws and skirts as well as to present comparatively smooth edges.

To set the jaws, the stirrup 5 is swung on its pivot moving the skirt of one jaw within the support 1 and the other skirt outwardly of the support exposing to view the operating arm 11 which then may be rotated in the proper direction to bring the bevelled end 25 thereof into the notch 24 of the holding disk 22. The bevelled end 25 of the operating arm when moved in the last named direction causes the holding disk to rotate in the direction indicated by the arrow in Figure 5 and as the arm passes the pivot of the holding disk, the latter owing to its weighted side gravitates to position the notch 21 for the V-shaped lug 20 of the latch to gravitate into and then positioning the treadle so that the latch element is in the notch of the treadle arm 15, the operating arm 11 will be held in an operative position. The jaws 7 are then free to be separated bringing the cam shaped edges 10 into engagement with the operating arm and returning the stirrup 5 into parallelism with the member 4, the jaws and skirt are then confined within the support 1 exposing the treadle 17 so that when an animal steps on said treadle, the weight frees the latch element 18 to set the operating arm in operation for closing the jaw on a portion of the animal.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A trap comprising a semi-spherical shaped support, anchoring means for the support, jaws pivoted to said support and disposed within the latter when in a set position, a treadle means for holding said jaws in a set position, means under the influence of said treadle means for urging the jaws outwardly of the support into gripping position, and semi-spherical shaped shields carried by the jaws and confined within the support when said jaws are in a set position and substantially close the space between the support and the jaws when the latter are in gripping position.

2. A trap comprising a semi-spherical shaped support, anchoring means for the support, a stirrup pivoted in said support, jaws pivoted to the stirrup, shields carried by the jaws and having cam shaped edges, a tension arm journalled to the stirrup to engage with the cam shaped edges of the shields, and a treadle means for holding the arm in an active position with the jaws occupying a spread position within the support.

3. A trap comprising a semi-spherical shaped support, anchoring means for the support, a stirrup pivoted in said support, jaws pivoted to the stirrup, shields carried by the jaws and having cam shaped edges, a tension arm journalled to the stirrup to engage with the cam shaped edges of the shields, a weighted latch element journalled to the stirrup and having oppositely disposed notches, one of said notches receiving the operating arm for holding the latter in an active position, a latch pivoted to the stirrup and engaging the other notch to hold the latch element against rotation, and a treadle pivoted to the stirrup to receive the latch element to prevent the disengagement of the latter from its respective notch until influenced by the weight of an animal thereon.

4. A trap comprising a self-righting, semispherical shaped casing, anchoring means for the casing, jaws pivoted within said casing and lying wholly within the latter when in a set position, and a treadle means for holding said jaws in a set position.

In testimony whereof I affix my signature.

HARRY COOPER.